(12) United States Patent
Loetscher

(10) Patent No.: US 10,895,847 B2
(45) Date of Patent: Jan. 19, 2021

(54) VALVE ORIENTATION DEVICE FOR TIMEPIECES

(71) Applicant: Omega SA, Biel/Bienne (CH)

(72) Inventor: Philippe Loetscher, Evilard (CH)

(73) Assignee: Omega SA, Biel/Bienne (CH)

( * ) Notice: Subject to any disclaimer, the term of this patent is extended or adjusted under 35 U.S.C. 154(b) by 313 days.

(21) Appl. No.: 16/052,746

(22) Filed: Aug. 2, 2018

(65) Prior Publication Data
US 2019/0072904 A1    Mar. 7, 2019

(30) Foreign Application Priority Data

Sep. 1, 2017  (EP) ..................................... 17189111

(51) Int. Cl.
*G04B 37/08*    (2006.01)
*F16K 17/04*    (2006.01)

(52) U.S. Cl.
CPC ............ *G04B 37/084* (2013.01); *F16K 17/04* (2013.01); *G04B 37/08* (2013.01)

(58) Field of Classification Search
CPC .... G04B 37/084; G04B 37/08; G04B 37/088; G04B 37/02; G04B 37/10; G04B 37/103; G04B 37/106; F16K 17/04; F16K 17/02
USPC ......... 368/291, 289–290, 288, 308, 319–321
See application file for complete search history.

(56) References Cited

U.S. PATENT DOCUMENTS 5,257,247 A  * 10/1993  Miche ................... G04B 37/103
                                              368/290
5,383,166 A  *  1/1995  Gallay ................. G04B 37/103
                                              368/288

2004/0257917 A1* 12/2004 Yoshikawa ............ G04B 37/10
                                              368/318
2005/0207285 A1*  9/2005 Omori ..................... G04B 37/10
                                              368/319
2007/0025190 A1*  2/2007 Cretin .................... G04B 3/046
                                              368/319

(Continued)

FOREIGN PATENT DOCUMENTS

CH          16 492/66      10/1968
CH          472 065         6/1969

(Continued)

OTHER PUBLICATIONS

European Search Report dated Mar. 6, 2018 in European Application 17189111.2, filed Sep. 1, 2017 (with English Translation of Categories of Cited Documents).

*Primary Examiner* — Edwin A. Leon

(74) *Attorney, Agent, or Firm* — Oblon, McClelland, Maier & Neustadt, L.L.P.

(57) ABSTRACT

An orientable valve including a device for adjusting the angular orientation of the valve head with respect to the watch case, wherein the device for adjusting the angular orientation of the valve head includes a friction ring disposed between the valve head and the upper step, the friction ring rotates integrally with the shaft and is free in translation with respect to the shaft, the friction ring has a cylindrical external friction surface in friction contact with an internal wall of the tube, and wherein the shaft includes, in its distal portion, a device for actuating the latter in rotation making it possible to pivot the valve to adjust the angular orientation of the valve head.

13 Claims, 1 Drawing Sheet

(56) References Cited

U.S. PATENT DOCUMENTS

2013/0100782 A1  4/2013  Cattaneo et al.
2014/0010055 A1  1/2014  Briswalter et al.

FOREIGN PATENT DOCUMENTS

EP  2 385 432 A2  11/2011
EP  2 685 327 A1   1/2014

* cited by examiner

VALVE ORIENTATION DEVICE FOR TIMEPIECES

BACKGROUND

This application claims priority from European Patent Application No. 17189111.2 filed on Sep. 1, 2017; the entire disclosure of which is incorporated herein by reference The present invention concerns a device for adjusting the orientation of a valve of a valve device screwed or pressed into a watch case and more specifically for automatic helium escape valve devices wherein the valve comprises a motif or a logo on its end face and wherein the motif can be oriented as desired.

Helium escape valve devices, also known as helium release valves, are present in certain dive watches for removing helium that has penetrated the watch case during saturation dives where divers inhale a gas mixture containing helium and oxygen. This allows them to stay inside a diving bell or underwater habitat for several days. During this time period, helium may penetrate the watch. In the absence of such a valve, internal overpressure caused by helium that has seeped in may, during the decompression phase, cause damage to the watch, such as, for example, loss of the crystal which may pop out or break.

An automatic valve device includes a valve having a cylindrical head integral with a central shaft arranged to be able to move in translation along its longitudinal axis in a tube screwed or pressed into a lateral portion of the watch case. The tube includes an internal shoulder defining an upper step and a lower step. The internal shoulder delimits a first upper space inside which is housed the valve head and a second lower space defining a passage connected to the interior of the case and into which extends one portion of the central shaft. An annular sealing gasket is disposed around the central shaft between the valve head and the upper step of the tube. The head is held in abutment against the gasket by means of a return spring surrounding the shaft portion housed inside the passage and extending between the lower step and a nut screwed onto the free end of the valve shaft. Thus, the gasket is able to rise up against the return force of the spring when the pressure inside the case becomes higher than the pressure outside. Gas is then evacuated from the interior of the watch to the exterior.

The manufacture and assembly of these valve devices, which are screwed or pressed into watch cases, are well known. However, methods for assembling such valve devices are ill suited to the devices when the valve bears an inscription or a motif, for example a logo, a trademark or similar sign, on its end face. Indeed, known assembly methods do not generally allow the valve head to be moved into a determined precise angular position with respect to the case when the valve device is assembled by screwing or pressing the tube into the watch case. This therefore detracts from the aesthetics of the watch when an inscription is affixed to the end face of the valve head. This situation is evidently unacceptable when these valve devices are fitted to high quality and luxury products.

BRIEF SUMMARY

It is an object of the present invention to overcome the drawbacks of the aforementioned prior art by providing a screw-in or press-in valve device, in particular an automatic helium escape valve device of simple and economical construction and wherein the valve head includes on its end face a motif, such as a logo or a trademark, and wherein the position of the logo or the trademark affixed to the end face of said head can easily be adjusted into a determined precise angular orientation or position.

To this end, the invention concerns an orientable valve device including:

a valve provided at a proximal end with a valve head integral with a central shaft terminating in a distal end, the front face of said head comprising a logo or a trademark, a tube intended to be assembled to a watch case, for example screwed-in or pressed-in, the shaft being arranged to be able to move in translation along its longitudinal axis in said tube, the tube comprising an inner shoulder defining an upper step and a lower step and delimiting a first upper space inside which is housed the valve head and a second lower space defining a passage connected to the interior of the watch case and into which extends one portion of the central shaft, a sealing gasket surrounding the central shaft to ensure the seal between the central shaft and an internal wall of the tube, and preferably disposed between the valve head and the upper step of the tube, a return spring surrounding the shaft portion housed inside the passage and extending between the lower step and a stop member arranged at the distal end of the valve shaft so as to hold the valve head in abutment against the gasket, and a device for adjusting the angular orientation of the valve head with respect to the watch case, characterized in that said device for adjusting the angular orientation of the valve head includes a friction ring arranged concentrically around the central shaft, between the valve head and the stop member, in that the friction ring rotates integrally with the shaft and is free in translation with respect to the shaft, in that the friction ring includes an external, for example cylindrical friction surface in friction contact with an inner wall of the tube, and in that said device for adjusting the angular orientation of the valve head includes means for rotational actuation of the latter making it possible to pivot the valve against the frictional forces generated by the friction ring in order to adjust the angular orientation of the valve head, said actuating means being preferably arranged in the distal portion of the shaft.

According to other advantageous aspects of the invention:
the actuating means also form the stop member for the return spring.
the actuating means is a nut.
the actuating means includes a slot,
the slot is arranged in the distal end of the shaft or in the nut.
the friction torque produced by the friction ring inside the tube is greater than the screw torque of the nut on the shaft.
the friction ring is arranged between the sealing gasket and the upper step.
the friction ring includes a polygonal opening and the shaft has a polygonal cross section complementary to said opening to make the shaft integral in rotation with the ring.
the stop ring can either be disposed in the first upper space or in the second lower space.

The invention also concerns a watch case including a valve device as described above.

BRIEF DESCRIPTION OF THE DRAWINGS

Other features and advantages of the present invention will appear more clearly from the following detailed description of a preferred embodiment, given by way of non-limiting example, with reference to the annexed drawings, in which.

DETAILED DESCRIPTION

Figure 1:
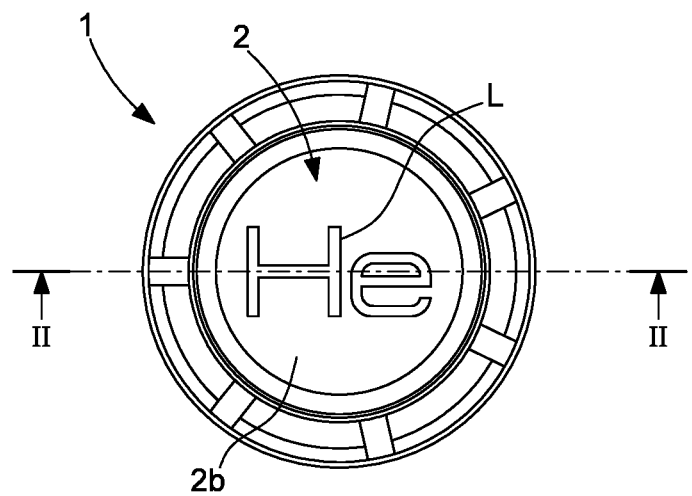
FIG. 1 shows a top view of an orientable valve device, provided with a logo on the external face of the valve head according to the invention.
Figure 2:
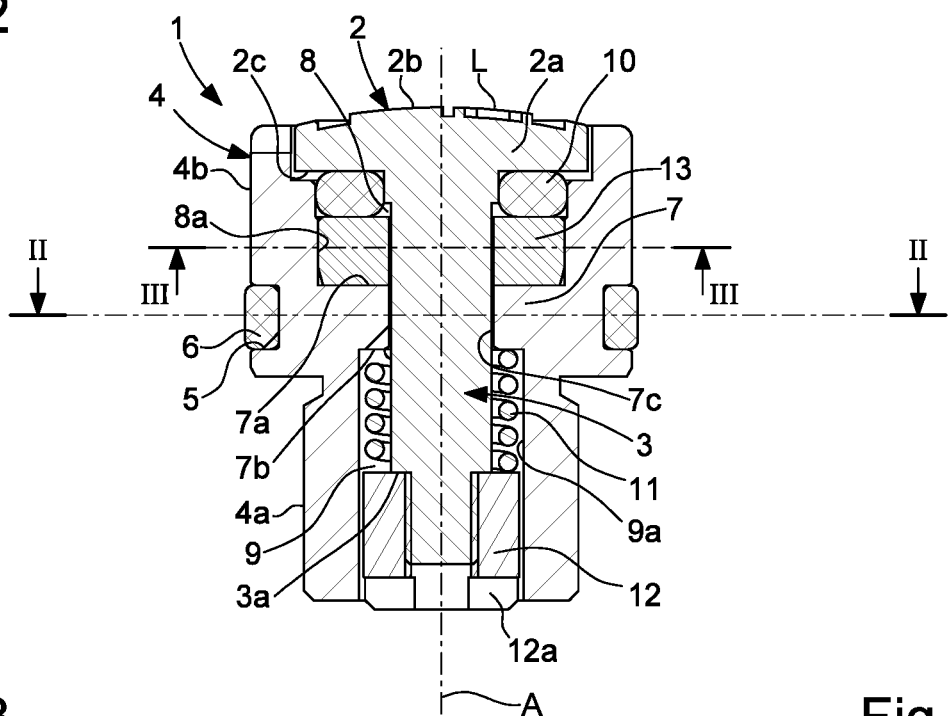
FIG. 2 shows a cross-sectional view of the orientable valve device according to the invention along the line II-II of FIG. 1.

FIGS. 1 and 2 represent an automatic valve device designated by the general reference 1 and intended to be mounted by being pressed or screwed into the side wall of a watch case middle (not represented).

In FIG. 1, which is a top view of valve device 1, the logo L "He" can be seen, arranged on the external face of a valve 2, inside which is housed the orientation adjustment device described below with reference to FIGS. 2 to 4. For aesthetic reasons, this logo L is adjusted in a perfectly horizontal position, preferably corresponding to the plane of the middle part of the watch case in which the valve is mounted.

Valve device 1 includes a valve 2 provided with a valve head 2a integral with a central shaft 3. The front face 2b of head 2a includes logo L.

Device 1 further includes a tube 4 intended to be pressed via its lower portion 4a into an opening in the watch case middle. Tube 4 has an upper portion 4b of larger diameter than lower portion 4a. In the lower area of its upper portion, tube 4 has an annular groove 5 inside which is housed an O-ring joint 6 which seals the tube with respect to the case middle.

Depending upon the embodiment, tube 4 can either end in an upper portion that protrudes from case middle or be embedded in the case middle.

Tube 4 has an internal shoulder 7 defining an upper step 7a and a lower step 7b and an opening 7c of reduced diameter. Internal shoulder 7 also delimits a first upper space 8, inside which is housed valve head 2, and a second lower space defining a passage 9, connected to the interior of the watch case.

Central shaft 3 is arranged inside tube 4 so as to be able to move in translation along its longitudinal axis A and to rotate freely in opening 7c.

The device further includes an annular sealing gasket 10 surrounding the central shaft and disposed beneath head 2a between the latter and upper step 7a.

It is also seen that device 1 further comprises a helical return spring 11 which surrounds the central portion of shaft 3 extending into or housed inside passage 8. Spring 11 is mounted compressed between lower step 7b and a stop member 12, integral in translation with central shaft 3 and arranged at the distal end of central shaft 3.

In the illustrated example, stop member 12 is a nut screwed onto the distal portion of the shaft tight against a shoulder 3a of the latter. Head 2a is thus held in abutment by its back face 2c against annular sealing gasket 10 by means of return spring 11.

The device further includes a device for adjusting the angular orientation of valve head 2 with respect to the watch case. The adjustment device includes a friction ring 13 disposed between valve head 2a and upper step 7a and, in the illustrated example, the friction ring is more specifically disposed between annular gasket 10 and upper step 7a. Friction ring 13 has a cylindrical external surface 13a whose diameter is an interference fit on inner wall 8a of upper space 8 of tube 4, and therefore in friction contact with said wall 8a.

It is evident that, in a variant, friction ring 13 could be disposed between annular gasket 10 and back face 2c of the valve head or even, in another variant, inside lower space 9, for example between the upper end of spring 11 and lower step 7b. In this latter case, the cylindrical external surface 13a of friction ring 13 has a diameter that is an interference fit on inner wall 9a of lower space 9 of tube 4 and is thus in friction contact with said wall 9a.

Figure 3:
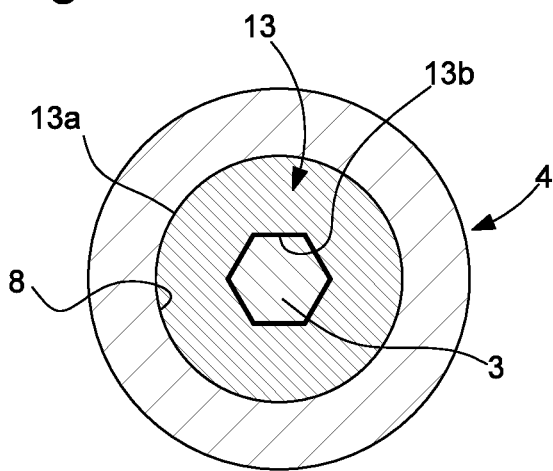
FIG. 3 shows a section of the orientable valve device according to the invention, along the line III-III of FIG. 2.
Figure 4:
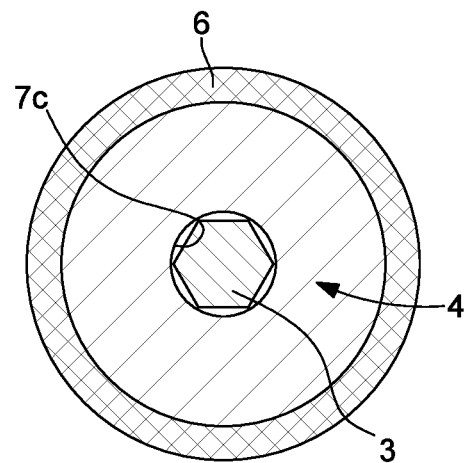
FIG. 4 shows a section of the orientable valve device according to the invention, along the line IV-IV of FIG. 2.

As seen in FIG. 3, friction ring 13 includes a central opening 13b of polygonal shape, in this case hexagonal, and central shaft 3 has a polygonal cross section complementary to opening 13b to make shaft 3 integral in rotation with friction ring 13 while allowing the shaft to move freely in translation in opening 13b.

It will be noted that nut 12 includes, in its distal face, a slot 12a intended to cooperate with the end of a tool in order to be screwed onto the distal portion of the shaft tight against shoulder 3a. Once screwed tight against shoulder 3a, since the friction fit of friction ring 13 on inner wall 8 is chosen so that the friction torque produced by the friction ring inside the tube is greater than the screw torque of nut 12 on central shaft 3, nut 12 thus acts as a means of actuating valve 2 in rotation, which makes it possible to pivot the valve and thereby adjust the angular orientation of valve head 2 into a determined angular position. It will be noted in this regard that the surface of internal wall 8a and/or cylindrical external surface 13a of the ring can be textured to adjust the appropriate friction torque.

It will be noted that, in this embodiment, nut 12 has a dual function, namely it forms both the stop member for return spring 11 and the means for actuating valve 2 in order to pivot and angularly orient said valve. However, in variant embodiments that are not represented, it is possible, without departing from the scope of the invention, to envisage arranging, for example, an elastic ring inserted into an annular groove of the distal portion of central shaft 3 as the stop member and a slot arranged directly in the fact of the distal end of central shaft 3, as the valve actuating means.

The method for mounting the valve device and orienting the valve is as follows. The completely assembled valve device 1, with nut 12 screwed tight against shoulder 3a of the shaft, is pressed or screwed into an opening in the watch case middle. Once the device is pressed or screwed in, with tube 4 thereby immobilised in the case middle, nut 12 can then be screwed on by means of a tool inserted into slot 12a from inside the case middle and can drive the valve head in rotation. The valve head in turn thereby drives friction ring 13, via the polygon connection between opening 13a and the cross-section of central shaft 3, into the desired angular position. Friction ring 13 turns in tube 4 against the retaining frictional force between external surface 13a of friction ring 13 and internal wall 8a of the upper space of the tube, which is lower than the torque applied by the tool to the nut when nut 12 is tight against shoulder 3a.

According to an alternative embodiment, it is possible to envisage arranging the means for rotational actuation in the proximal portion of the valve and, in particular, front face 2b of valve head 2a could be arranged to include housings for receiving the ends of an operating tool. Alternatively, it is possible to envisage the valve head protruding slightly with respect to the external end face of the tube and having a non-circular, for example hexagonal, side surface, capable of being gripped by a suitable tool.

What is claimed is:

1. An orientable valve device comprising:
    a valve provided at a proximal end with a valve head integral with a central shaft terminating in a distal end, a front face of said head comprising a logo or a trademark,
    a tube intended to be assembled to a watch case, the shaft being arranged to be able to move in translation along its longitudinal axis in said tube, the tube comprising an inner shoulder defining an upper step and a lower step and delimiting a first upper space inside which is housed the valve head and a second lower space defining a passage connected to the interior of the watch case and into which extends one portion of the central shaft,
    a sealing gasket surrounding the central shaft to ensure the seal between the shaft and an internal wall of the tube,
    a return spring surrounding the shaft portion housed inside the passage and extending between the lower step and a stop member arranged at the distal end of the valve shaft so as to hold the valve head in abutment against the gasket, and
    a device for adjusting the angular orientation of the valve head with respect to the watch case, wherein
    said device for adjusting the angular orientation of the valve head includes a friction ring arranged concentrically around the central shaft, between the valve head and the stop member,
    wherein the friction ring rotates integrally with the shaft and is free in translation with respect to the shaft,
    wherein the friction ring includes an external friction surface in friction contact with an internal wall of the tube,
    and wherein said device for adjusting the angular orientation of the valve head includes means for rotational actuation of the valve head making it possible to pivot the valve against the frictional forces generated by the friction ring in order to adjust the angular orientation of the valve head.

2. The orientable valve device according to claim 1, wherein the actuating means are arranged in the distal portion of the central shaft.

3. The orientable valve device according to claim 2, wherein the actuating means also form the stop member for the return spring.

4. The orientable valve device according to claim 2, wherein the actuating means is a nut.

5. The orientable valve device according to claim 1, wherein the actuating means includes a slot.

6. The orientable valve device according to claim 5, wherein the slot is arranged in the distal end of the shaft or in the nut.

7. The orientable valve device according to claim 1, wherein the friction torque generated by the friction ring inside the tube is greater than the screw torque of the nut on the shaft.

8. The orientable valve device according to claim 1, wherein the friction ring is arranged between the sealing gasket and the upper step.

9. The orientable valve device according to claim 1, wherein the friction ring includes an opening of polygonal shape and wherein the shaft has a polygonal cross section complementary to said opening to make the shaft integral in rotation with the ring.

10. The orientable valve device according to claim 1, wherein the friction ring is disposed in said first upper space.

11. The orientable valve device according to claim 1, wherein the friction ring is disposed in said second lower space.

12. The orientable valve device according to claim 1, wherein the sealing gasket is arranged between the valve head and the upper step of the tube.

13. A watch case comprising an orientable valve device including:
    a valve provided at a proximal end with a valve head integral with a central shaft terminating in a distal end, a front face of said head comprising a logo or a trademark,
    a tube intended to be assembled to a watch case, the shaft being arranged to be able to move in translation along its longitudinal axis in said tube, the tube comprising an inner shoulder defining an upper step and a lower step and delimiting a first upper space inside which is housed the valve head and a second lower space defining a passage connected to the interior of the watch case and into which extends one portion of the central shaft,
    a sealing gasket surrounding the central shaft to ensure the seal between the shaft and an internal wall of the tube,
    a return spring surrounding the shaft portion housed inside the passage and extending between the lower step and a stop member arranged at the distal end of the valve shaft so as to hold the valve head in abutment against the gasket, and
    a device for adjusting the angular orientation of the valve head with respect to the watch case,
    wherein said device for adjusting the angular orientation of the valve head includes a friction ring arranged concentrically around the central shaft, between the valve head and the stop member,
    wherein the friction ring rotates integrally with the shaft and is free in translation with respect to the shaft,
    wherein the friction ring includes an external friction surface in friction contact with an internal wall of the tube, and
    wherein said device for adjusting the angular orientation of the valve head includes means for rotational actuation of the valve head making it possible to pivot the valve against the frictional forces generated by the friction ring in order to adjust the angular orientation of the valve head.

* * * * *